June 23, 1925.
M. H. ARNOLD
HOSE COUPLER
Filed Nov. 23, 1923
1,543,356
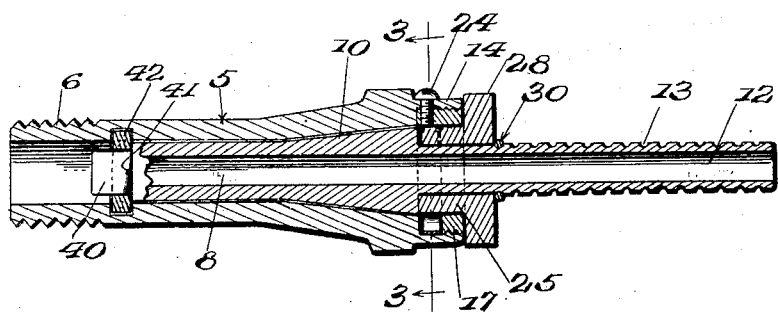
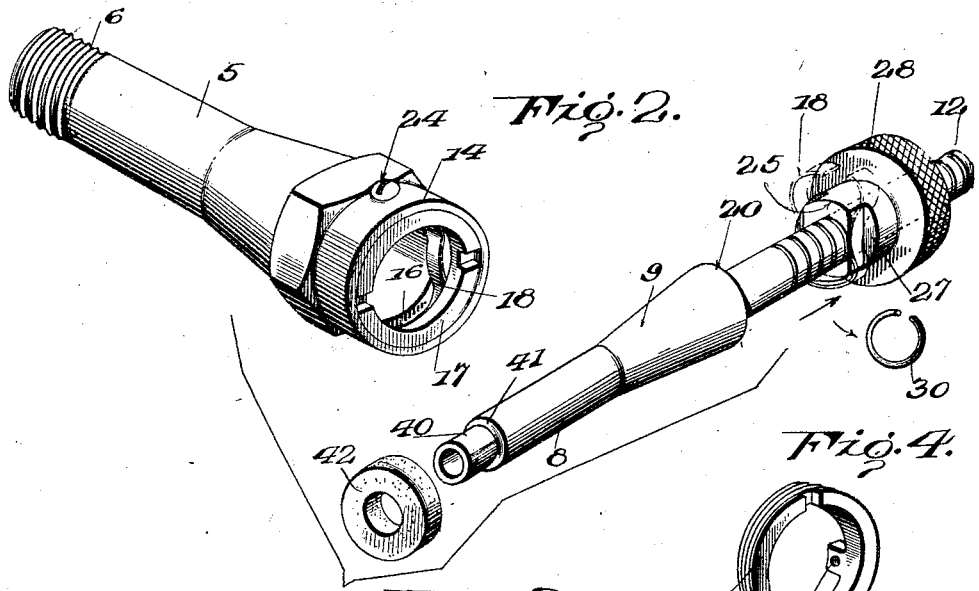
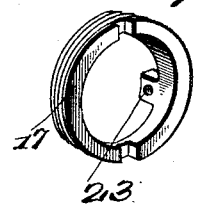
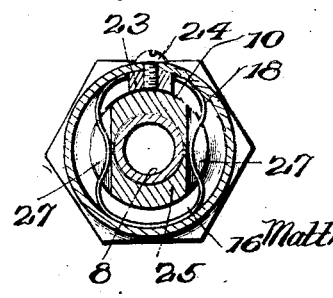
WITNESSES
INVENTOR
Matthew H. Arnold.
BY
ATTORNEYS Patented June 23, 1925.

1,543,356

UNITED STATES PATENT OFFICE.

MATTHEW HARKWOOD ARNOLD, OF LOS ANGELES, CALIFORNIA.

HOSE COUPLER.

Application filed November 23, 1923. Serial No. 676,611.

*To all whom it may concern:*

Be it known that I, MATTHEW HARKWOOD ARNOLD, a citizen of the United States, and resident of Los Angeles, in the county of Los Angeles and State of California, have invented certain new and useful Improvements in Hose Couplers, of which the following is a specification.

This invention relates to couplings especially adapted for connecting an air hose to a compressed air hose although not necessarily restricted to such use.

Briefly stated, an important object of this invention is to provide novel means whereby the sections of the coupling may be quickly connected or instantly separated without the necessity of first loosening bolts, nuts, or other fastening devices, by means of tools.

A further object is to provide a coupling of the class described having novel means whereby leakage of the fluid pressure is prevented.

Also the invention forming the subject matter of this application aims to provide a coupling of the class described which is of highly simple construction, durable in use and cheap to manufacture.

Other objects and advantages of the invention will be apparent during the course of the following description.

In the accompanying drawing, forming a part of this application, and in which like numerals are employed to designate like parts throughout the same, Figure 1 is a vertical sectional view through the improved coupling.

Figure 2 is a group perspective of the several parts of the coupling.

Figure 3 is a vertical sectional view taken on line 3—3 of Figure 1.

Figure 4 is a perspective of a wing-nut embodied in the invention.

In the drawing wherein for the purpose of illustration is shown a preferred embodiment of the invention, the numeral 5 generally designates an outer section which may be interiorly or exteriorly screw threaded as indicated at 6 for engagement with a compressed air drill. However, any suitable attaching means may be employed in lieu of the threads 6 and it is to be understood that the section 5 is not necessarily attached to a compressed air drill as it is quite obvious the hose section may be connected thereto, As illustrated in Figures 1 and 2, an inner section 8 is adapted to be received within the outer section and is snugly received within the same so as to provide an air tight connection between the inner and outer sections. It will be observed that the inner section 8 is gradually increased in diameter as indicated at 9 and the bore of the outer section 5 is increased in diameter as indicated at 10 so as to receive the gradually enlarged portion 9. The portions 9 and 10 flatly contact with each other whereby an air tight connection is provided between the parts. In carrying out the invention the inner section 8 is extended for a substantial distance beyond the enlarged portion 9 and is adapted to extend into a hose section. Figure 1 illustrates that the attaching portion 12 of the inner section 8 is formed with a series of annular grooves 13 to receive portions of the hose whereby an airtight connection is provided between the attaching portion 12 and the hose section connected thereto.

Attention is directed to Figures 1 and 2 which illustrates that the rear portion of the outer section 5 is provided with an annulus 14 which is defined by enlarging the bore of the outer section at its rear end. By thus enlarging the bore of the outer section at its rear end an annular shoulder 15 is provided and a ring nut 17 is threaded into the annulus 14 to cooperate with the annular shoulder 16 in defining an annular groove.

That is to say the annular shoulder 15 and the ring nut 17 are arranged in spaced relation to each other to define the annular groove which receives a locking spring designated by the numeral 18. Figures 2 and 3 plainly illustrate that the locking spring 18 is formed from a single length of spring metal bent intermediate its ends and having sides bowed inwardly to define locking devices adapted to be engaged with an annular shoulder 20 formed intermediate the ends of the inner section 8. The annular shoulder 20 is formed by the enlarged portion 9 of the inner section 8 and when the inner section is introduced into the outer section the bowed portions of the spring 18 are engaged with the annular shoulder 20 so as to prevent the accidental withdrawal of the inner section.

Figure 3 illustrates that the ends of the spring 18 are engaged by a laterally extending lug 23 carried by the inner edge of the locking or ring nut 17. The lug 23 serves to prevent movement of the spring 18 and is provided with a threaded opening for the reception of a screw bolt 24 extended through the annulus 14 whereby to securely lock the ring nut in position. When the screw bolt 24 is engaged with the lug 23 as illustrated in Figure 3, the ring nut is held against rotation and consequently the spring 18 cannot become displaced.

When it is desired to spread the sides of the substantially U-shaped locking spring a releasing sleeve 25 is mounted on the attaching portion 12 is rotated so as to present the rounded side of the same to the bowed portions of the spring. When this is done, the bowed portions of the spring are spread outwardly so that the spring will clear the annular shoulder 20. When the bowed portions of the spring are thus moved outwardly the inner section is free to be withdrawn. On the other hand when the releasing sleeve 25 is in its normal position the oppositely arranged recesses or grooves 27 in the same receives the bowed portions of the spring and thereby permits the spring to contact with the annular shoulder 20 for preventing the accidental withdrawal of the inner section. The releasing sleeve 25 is provided with an annular flange 28 by means of which the sleeve may be manually rotated for presenting the rounded side of the sleeve to the bowed portions of the spring. It might be said that the releasing sleeve is provided with oppositely arranged cams which are engaged with the bowed portions of the spring so as to spread the same. Figure 1 illustrates that the releasing sleeve 25 is held in position on the attaching portion 12 by means of a split ring which is received within one of the grooves in the attaching portion. The split ring 30 only serves to prevent rearward longitudinal movement of the sleeve 25 and prevents rotation of the sleeve on the attaching portion.

In operation, the inner section 8 is introduced into the outer section and the bowed portions of the spring are spread by the gradually enlarged portion 9 of the inner section. As the bowed portions of the spring ride over the end of the enlarged portion 9, the bowed portions are engaged by the annular shoulder 9 and the inner section is thereby held against withdrawal. When it is desired to separate the sections, the annular flange 28 is rotated for presenting the oppositely arranged rounded portion or cam to the bowed portion of the spring whereby the bowed parts of the spring are spread, beyond the annular shoulder 20. At this point the inner section may be withdrawn and the bowed portions of the spring will move over the gradually enlarged portion 9 of the inner section. Attention is directed to the fact that the laterally directed lug 23 not only serves as an attaching means for the nut but also as a means to maintain the nut in spaced relation to the annular shoulder 15. This assures adequate space for the spring 18 and consequently the nut cannot bind against the spring.

Furthermore the lug 23 maintains the ends of the spring in spaced relation and prevents the same from overlapping.

As illustrated in Figures 1 and 2 the forward portion of the inner section 8 is reduced as indicated at 40 to provide an annular shoulder 41 with which a gasket or shoulder 42 is adapted to be engaged. Figure 1 plainly illustrates that the gasket 42 which may be of rubber, leather or flexible metal is received within an internal groove in the outer member 5 and when the section 8 is inserted into the outer member the annular shoulder 41 will contact with the gasket 42 and thereby provide an air tight connection between the inner and outer sections. It will be observed that the pressure of air on one side of the gasket 42 will force the gasket into air tight engagement with the shoulder 42 and the adjacent wall of the internal groove 42. The gasket is, of course, provided with a centrally arranged opening for the reception of the reduced portion 40 of the inner section.

The improved means for detachably connecting the inner and outer sections as illustrated in Figure 3 may be applied to the dust cap of the air valve on the inner tube, and in fact the inventive idea involved may be carried out in a number of places all of which are within the scope of this invention.

With reference to the foregoing description it will be observed that the improved coupling is capable of ready separation and absolutely prevents the escape of air and the like.

Having thus described the invention, what is claimed is:—

1. A coupling comprising inner and outer sections, the outer section being provided at its rear end with an annulus, a ring-nut threaded into said annulus and cooperating with the rear end of the outer section in defining an annular groove, a locking spring arranged in said annular groove and having bowed portions constituting locking devices, the inner section being provided intermediate its ends with a gradually enlarged portion defining an annular shoulder adapted to be engaged by said locking devices.

2. A coupling comprising inner and outer sections, the outer section being provided at its rear end with an annulus, a ring-nut threaded into said annulus and cooperating with the rear end of the outer section in defining an annular groove, a locking spring arranged in said annular groove and having bowed portions constituting locking devices; the inner section being provided intermediate its ends with a gradually enlarged portion defining an annular shoulder adapted to be engaged by said locking devices, and a lug projecting laterally from said nut and arranged in said annular groove between the ends of the spring and limiting the inward movement of the nut and holding the spring in position.

3. A coupling comprising inner and outer sections, the outer section being provided at its rear end with an annulus, a ring-nut threaded into said annulus and cooperating with the rear end of the outer section in defining an annular groove, a locking spring arranged in said annular groove and having bowed portions constituting locking devices, the inner section being provided intermediate its ends with a gradually enlarged portion defining an annular shoulder adapted to be engaged by said locking devices, a lug projecting laterally from said nut and arranged in said annular groove between the ends of the spring and limiting the inward movement of the nut and holding the spring in position, and a screw bolt threaded through said annulus and engaging said lug whereby to hold the same in position.

4. A coupling comprising inner and outer sections, the outer section being provided at its rear end with an annulus, a ring-nut threaded into said annulus and cooperating with the rear end of the outer section in defining an annular groove, a locking spring arranged in said annular groove and having bowed portions constituting locking devices, the inner section being provided intermediate its ends with a gradually enlarged portion defining an annular shoulder adapted to be engaged by said locking devices, a lug projecting laterally from said nut and arranged in said annular groove between the ends of the spring and limiting the inward movement of the nut and holding the spring in position, a screw bolt threaded through said annulus and engaging said lug whereby to hold the same in position, and a releasing sleeve rotatably mounted on said inner section and having grooved portions to receive the locking devices and having oppositely arranged rounded surfaces adapted to spread said locking devices beyond said shoulder.

5. A coupling comprising inner and outer sections, the outer section being provided at its rear end with an annulus, a ring-nut threaded into said annulus and cooperating with the rear end of the outer section in defining an annular groove, a locking spring arranged in said annular groove and having bowed portions constituting locking devices, the inner section being provided intermediate its ends with a gradually enlarged portion defining an annular shoulder adapted to be engaged by said locking devices, a lug projecting laterally from said nut and arranged in said annular groove between the ends of the spring and limiting the inward movement of the nut and holding the spring in position, a screw bolt threaded through said annulus and engaging said lug whereby to hold the same in position, a releasing sleeve rotatably mounted on said inner section and having grooved portions to receive the locking devices and having oppositely arranged rounded surfaces adapted to spread said locking devices beyond said shoulder, said releasing sleeve being provided with an annular flange constituting a means whereby the releasing sleeve may be manually rotated.

6. A coupling comprising inner and outer sections, the inner and outer sections being provided with means whereby an air tight connection is provided, the outer section being provided at its rear portion with an annular shoulder and an annulus, a ring-nut threaded in said annulus and having a laterally projecting lug contacting with said shoulder whereby to limit the movement of the nut into the annulus, a screw bolt threaded through said annulus and engaged with said lug, whereby to hold the ring-nut in position, a locking spring of substantially U-shaped formation arranged in said annulus and having its ends engaged by said lug, the sides of said spring being bowed inwardly to constitute locking devices, the inner section being provided intermediate its ends with an annular shoulder engaged by said locking devices, a releasing sleeve mounted on said inner section and engaged with said second named annular shoulder, said releasing sleeve being provided with oppositely arranged grooved portions and with oppositely arranged rounded surfaces adapted to engage said bowed portions whereby to spread the same beyond said second named shoulders and a locking ring mounted on said inner section and engaged with said releasing sleeve to hold the same in position, said releasing sleeve being provided with an annular flange engaged with said annulus and constituting a means whereby the releasing sleeve may be manually rotated.

MATTHEW HARKWOOD ARNOLD.